(12) United States Patent
Yamane

(10) Patent No.: US 6,763,188 B2
(45) Date of Patent: Jul. 13, 2004

(54) CAMERA PHOTOMETER

(75) Inventor: Kenji Yamane, Saitama (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 10/616,317

(22) Filed: Jul. 9, 2003

(65) Prior Publication Data

US 2004/0037550 A1 Feb. 26, 2004

(30) Foreign Application Priority Data

Jul. 10, 2002 (JP) ........................................ 2002-200839

(51) Int. Cl.⁷ ............................................ G03B 7/099
(52) U.S. Cl. ...................................... 396/268; 396/274
(58) Field of Search .................................. 395/268, 274

(56) References Cited

U.S. PATENT DOCUMENTS 5,136,326 A   8/1992   Yokota et al.

FOREIGN PATENT DOCUMENTS

JP   11002853   1/1999

*Primary Examiner*—David M. Gray
(74) *Attorney, Agent, or Firm*—Price, Heneveld, Cooper, DeWitt & Litton, LLP

(57) ABSTRACT

Light beams, reflected on an outer surface around a lens barrel which may be incident to a light receptor, are intercepted at a maximum by a camera photometer embodying a light shield mask having a wide range light shield formed to intercept light over a wider range at a part near a lens barrel when the light receptor of an AE device is arranged in the vicinity of the lens barrel. The light shield mask is an elastic thin member stuck onto the incidence surface of the condenser lens of the photometer and has an opening formed to be partly like a circular arc but along a chord of the circular arc elsewhere to form a wide range light shield outside the chord.

16 Claims, 4 Drawing Sheets

CAMERA PHOTOMETER

BACKGROUND OF THE INVENTION

1. Field of the Invention

The present invention relates to a photometer to receive light from a subject to obtain exposure for an auto exposure camera or more particularly to a camera photometer in which metering light equivalent to photographic light can be incident to a light receiving element of the photometer.

2. Description of the Related Art

Cameras equipped with an auto focusing device or an auto exposure device are now widely used so that even a beginner in photography can readily take wonderful photos without missing a good timing to press the shutter button. An auto focusing device is a device to measure a distance to a subject by a predetermined operation such as aiming the camera to the subject to press the shutter button just a half way, and to focus on a subject automatically.

The auto exposure device is a device to measure the brightness of a subject as the shutter button is pressed to take a picture and automatically determines the exposure. Light beams required to measure the brightness of a subject are incident, with an image formed by a condenser lens, to a light receiving element or detector, such as a CdS element, to measure the brightness of the subject. To bring such measuring light beams incident to a light receiving element, a light shield mask or a diaphragm is arranged between a condenser lens and a light receiving element, as described in Japanese Utility Model Registration No. 2515036, in order to prevent light beams unnecessary for measurement from being incident to the light receiving element. Then, Japanese Laid-Open Patent Application No. 1999-2853 describes that a light shield layer is arranged inside a light receptor window to limit the range of light transmission to a light receptor window and also that an incident light limiting member equipped with a light receptor diaphragm between a light receptor window and a light receptor for a measuring element. These elements are arranged to limit incidence of light beams unnecessary for measurement, limiting the range of incidence with a light receptor diaphragm, while the incident light limiting member is black in its inside to prevent irregular reflection inside the member.

To take a photograph of a subject, exposure is given by light transmitted through a photographic lens. However, when a photographic lens and a light receiving element are distant from each other, spatial parallax may occur between photographic light for exposure and metering light incident to the light receiving element. To make the photographic light and the metering light as equivalent to each other as possible, the light receiving element should preferably be placed in the vicinity of the photographic lens.

For better photographing enjoyment, a camera is frequently equipped with a variable focusing device, such as a zoom lens device and/or a focal distance switching device, which is capable of changing the focal distance of a photographic lens. The lens barrel of the photographic lens travels forward or backward in the direction of the optical axis, when switching the focal distance with such a variable focusing device. With new cameras, the focal distance is changed at a larger and larger rate, pushing the lens barrel more and more forward. As a result, the lens barrel has a wider area of side surface to reflect more outside light beams. A wide use type of camera, painted on the outer surface around the lens barrel to give metallic luster like an expensive camera, particularly reflects more light beams. Moreover, even more light beams are reflected when nearly back lighted.

Light beams, reflected on the outer surface around the lens barrel, also impinge upon the light receiving element, trying to be incident into the light receptor through the light receiving window arranged before the light receiving element, but are intercepted e.g. by the light shield layer. But when more light beams are reflected on a wider area of outer surface around the lens barrel, more light beams try to impinge upon the light receptor and the light shield layer may fail to prevent all of them from penetrating it. Moreover, when the light receiving element is placed in the vicinity of the lens barrel to make the metering light equivalent to the photographic light, reflected light beams reach there without being attenuated, inviting penetration of more intensified light. Then, some reflected light beams, incident at an end of the light receiving window, may penetrate into the light receptor. Such penetrating light may be irregularly reflected inside the light receptor to reach the light receiving element at last. These effects can cause erroneous metering, resulting in improperly exposed photographs.

SUMMARY OF THE INVENTION

An object of the present invention is to provide a camera photometer capable of assuring incidence of metering light to a light receiving element in spite of increased or intensified incident light beams.

The above object is technically achieved by the camera photometer of the present invention comprising a photo metering window arranged on the front face of a camera to make incidence of subject light there from, a condenser lens to collect the light to make it incident to a light receiving element, to control exposure based on subject brightness information of light beams received at the light receiving element, characterized in that a light shield mask having an opening behind the photo metering window is arranged to form a wide range light shield, at a part of the light shield mask, shaped to cut off light over a wider range than the rest.

Subject light and other outside light beams are incident from the photo metering window. Light beams for photometry incident from subject light are incident to a condenser lens to form an image on the light receiving element for measurement of subject brightness. Outside light beams unnecessary for photometry are intercepted by the light shield mask and prevented from being incident on the light receiving element. In the presence of high luminous energy light among the outside light beams, the light shield mask is set to place the wide range light shield where the light beams are incident, thereby intercepting and preventing the high luminous energy light from penetrating into the light receptor. Only light beams necessary for measuring subject brightness can be incident at a maximum to the light receiving element.

The camera photometer of the present invention is characterized in that the edge of the opening of the light shield mask is formed to be continuous between a part along a circular arc and a part along a chord of the circular arc and to form a wide range light shield to intercept light beams over a wider range at the part facing the chord.

A condenser lens is circularly formed in its outer shape in general and unnecessary outside light may be included among light beams transmitting around there. The light shield mask is formed to have a circular opening having an inner diameter smaller, as needed, than the outer diameter of the condenser lens in order to intercept light beams transmitted around the condenser lens. This circle may be partly linked not with a chord but with a circular arc to form an opening e.g. into a circular shape partly missing a circular arc. However, a light shield mask can be easily made, if the edge of the circle is partly linked with a chord of the circle to form the wide range light shield at a part of the circle.

The camera photometer of the present invention is characterized in that the wide range light shield is placed at a part facing the lens barrel of the photographic lens.

For example, the lens barrel is extended forwardly for the photographic lens to have a longer focal distance. Then, a larger outside area around the lens barrel is exposed to have a maximum area when extended all the way to the front end at a maximum focal distance, also to have a maximum light reflection on the outer surface around the lens barrel. Incidence of this high luminous energy reflected light into the light receptor comprising a light receiving element and condenser lens is minimized by placing the wide range light shield to face the lens barrel.

The camera photometer of the present invention is characterized in that the optical axis of the light receptor comprising the light receiving element, condenser lens, photo metering window etc. is arranged in the vicinity of the outer surface of the lens barrel of the photographic lens.

High precision photo metering data can be obtained, efficiently taking subject light while intercepting reflected light beams from the outer surface around the lens barrel, also with a camera designed to have a photo metering window at its upper front, having a condenser lens and a light receiving element behind it, if the camera has the wide range light shield placed to face the lens barrel of the photographic lens. However, the wide range light shield is more efficiently used, if the light receptor, placed in the vicinity of the lens barrel, has the wide range light shield placed to face the lens barrel, because light beams reflected on the outer surface around the lens barrel to be incident to the light receptor placed in the vicinity of the lens barrel are not so much attenuated as light beams incident to a light receptor distant from there, inviting incidence of more intensified light.

The camera photometer of the present invention is characterized in that the light shield mask is elastic and coupled to the incidence side of the condenser lens.

The light shield mask can be arranged in a more simplified construction by applying it to a condenser lens. In addition, an elastic light shield mask flexibly fits the surface of the condenser lens in close contact with the condenser lens, thereby minimizing incidence of light beams at an end of the condenser lens and assuring prevention of light beams from being reflected at the end.

These and other features, objects and advantages of the present invention will become apparent upon reading the following description thereof together with reference to the accompanying drawings.

DETAILED DESCRIPTION OF THE EMBODIMENTS

The camera photometer according to the present invention will be specifically explained here below, based on the illustrated preferred embodiments.

Figure 1:
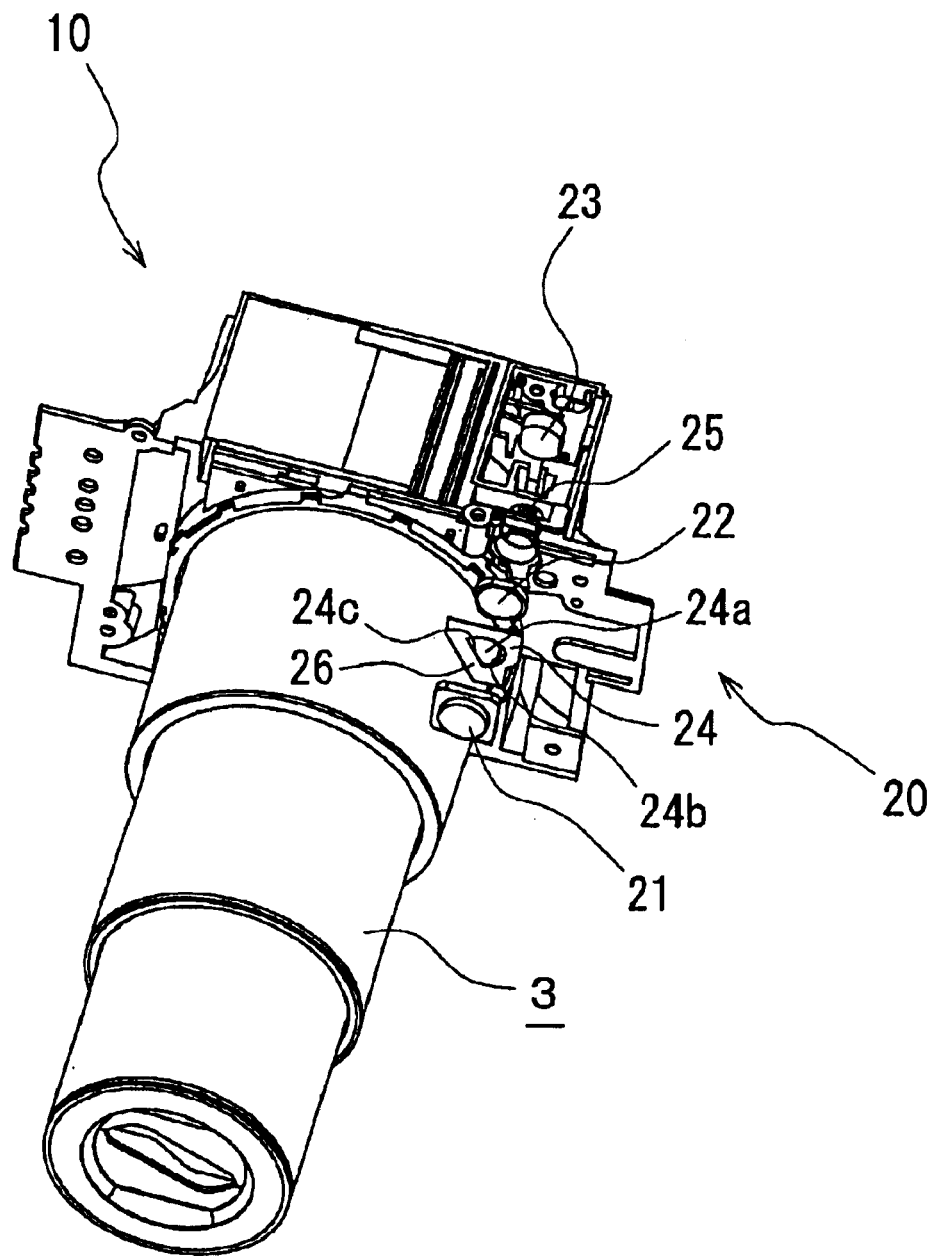
FIG. 1 is a fragmentary perspective view of the main body of a camera equipped with a photometer of the present invention.
Figure 2:
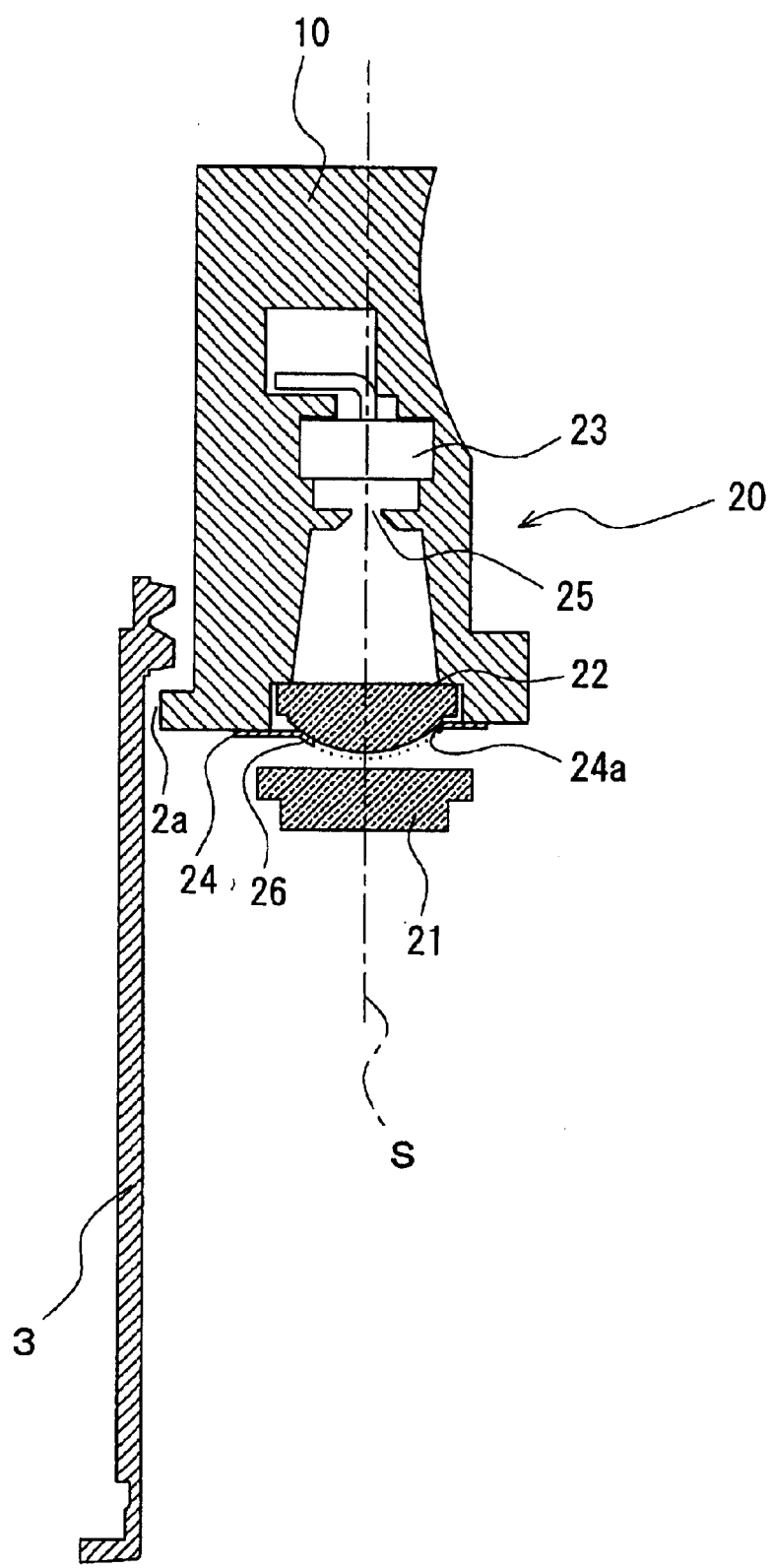
FIG. 2 is a fragmentary cross-sectional view of the perspective view of FIG. 1, along a central horizontal plane.
Figure 4:
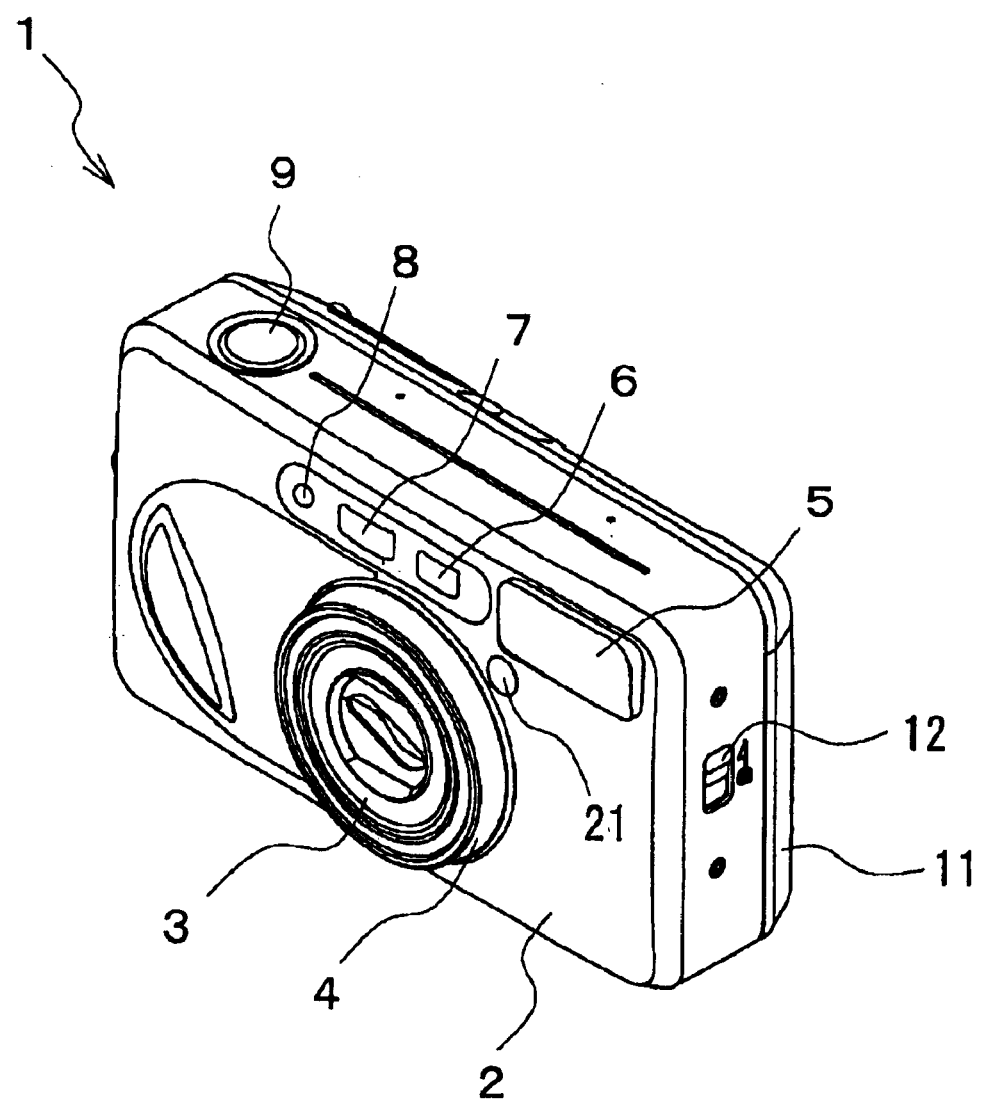
FIG. 4 is a perspective view of a camera equipped with a photometer of the present invention.

FIG. 4 is a perspective view showing the appearance of a wide use type camera 1 appropriate to be equipped with a photometer of the present invention. Camera 1 is covered in front with a front cover 2 and equipped at center with lens barrel 3 to hold a zoom photographic lens. This lens barrel 3 moves forward or backward in an optical direction to change the focal distance with a photographic lens traveling in the same direction. This lens barrel 3 is arranged on the main body 10 of the camera, as shown in FIG. 1, and the front cover 2 covers from its front and almost all over its sides. Lens barrel 3 is exposed, as shown in FIG. 2, from opening 2a opened on front cover 2 and a decorative ring 4 is arranged around opening 2a. Above lens barrel 3 are arranged electronic flash head window 5 to emit electronic flash light when shooting with electronic flash, a finder objective window 6 faced with a finder objective lens, an auto-focus (AF) light receptor window 7 faced with light receiving means for the automatic focusing device, and a remote control light receptor window 8 faced with remote control light receiving means to receive signal light from remote control to actuate the camera from outside. Camera 1 has on its upper surface a shutter-release button 9. A lock 12 is arranged on the side of front cover 2 to be engaged at a part of back lid 11, when closing the back lid 11, to prevent any unintended opening or to release engagement when opening the back lid.

Auto-exposure (AE) photo metering window 21 as a light receptor window for an auto exposure device is arranged diagonally above the lens barrel 3. Condenser lens 22 and a CdS light receiving element 23 are arranged behind this AE photo metering window 21. Optical axis S of light receiving device 20 comprising this AE photo metering window 21, the condenser lens 22 and the light receiving element 23 is arranged as near lens barrel 3 as possible as structurally tolerated. A light shield mask 24 is coupled onto the surface of the condenser lens 22 and diaphragm 25 is formed before light receiving element 23.

Figure 3:
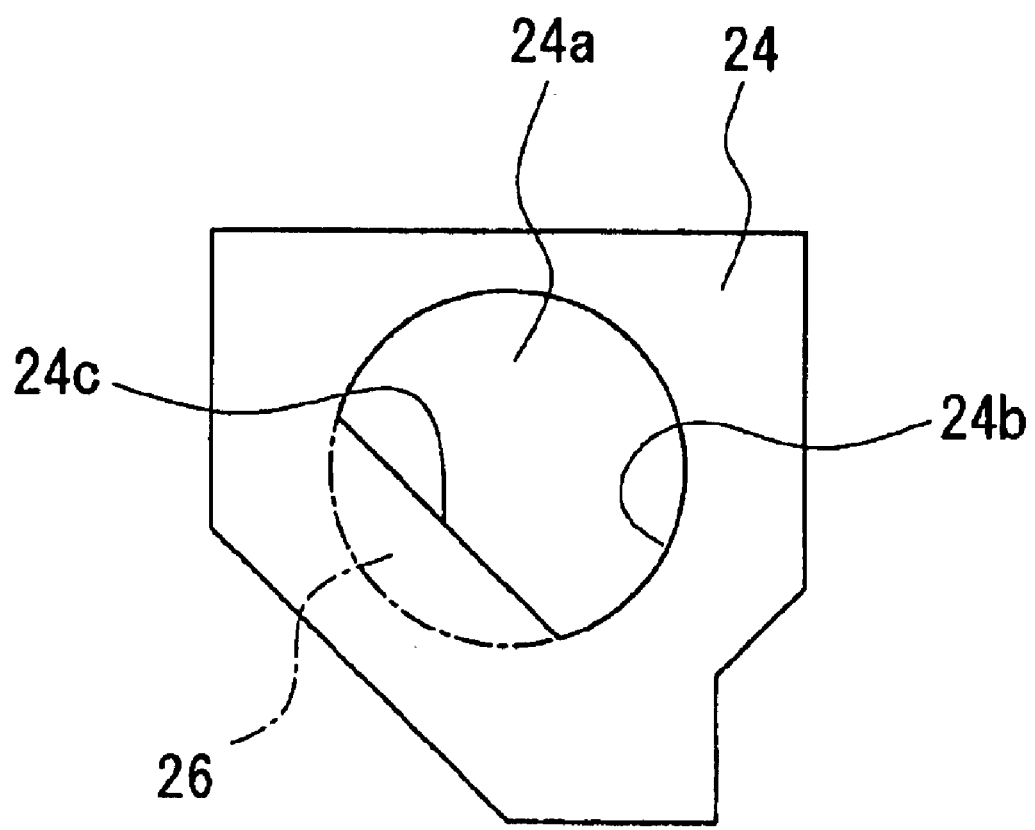
FIG. 3 is a front view of a light shield mask arranged at a photometer of the present invention.

The light shield mask 24 has, at its center, opening 24a, as shown in FIG. 3, while all the rest other than opening 24a are dark enough to cut off light beams or their reflection. Then, around this opening 24a, main diaphragm 24b formed almost like a circular arc is continuous with sub diaphragm 24c formed with edge by a chord of the circular arc. Wide range light shield 26 is formed with a part outside this sub diaphragm 24c to cut off light beams reaching the wide range light shield 26. As shown in FIG. 1, light shield mask 24 is stuck onto the condenser lens 22 for the wide range light shield 26 to face lens barrel 3. In other words, opening 24a is placed for a chord forming the sub diaphragm 24c to be almost orthogonal to a straight line between an optical axis of the photographic lens and optical axis S of light receptor 20. The light shield mask 24 is made of a dark colored elastic material formed into a thin sheet deformable to fit the surface of condenser lens 22. Mask 24 preferably is black and is adhesively attached to the condenser lens using a conventional adhesive.

Working of the photometer of the present invention will be explained here below about embodiments constructed as above.

Camera 1 is aimed at a subject to take a photograph, e.g. to push a half way the shutter button 9. The automatic focusing device works to measure a distance to the subject with subject light transmitted through AF photo metering window 7. Then, shutter button 9 is pushed down all the way to compute and provide an exposure, based on subject light incident from the AE photo metering window 21. Outside light beams irrelevant to the subject light, such as light reflected on the outer surface around lens barrel 3 or the like, may be incident to AE photo metering window 21 and such incident light, reflected on the end face of AE photo metering window 21, may penetrate into light receptor 20 as renegade light beams. However, penetration of such renegade light beams is avoided due to the light shield mask 24.

Light beams, reflected on the outer surface around the lens barrel 3, in particular, reach the wide range light shield 26 to be prevented from penetrating into light receptor 20, even with more light beams reflected from a wider surface around lens barrel 3 more projecting at a higher magnification rate of a zoom lens device. Therefore, light beams incident from AE photo metering window 21 are incident to condenser lens 22 from the opening 24a but not from other parts of light shield mask 24. As a result, almost all light beams are relevant to the photographic subject brightness. Renegade light beams, irrelevant to subject brightness, transmitted through condenser lens 22 are prevented by mask 24 from being incident to light receiving element 23.

Therefore, light beams incident to light receiving element 23 contribute to subject brightness information and high precision subject brightness information can be obtained at light receiving element 23. Then, the shutter opens to give exposure to film in accordance with exposure obtained, based on thus obtained photo metering data. This allows a camera work at most appropriate exposure assured to respond to subject brightness.

In a photometer of this embodiment, AE photo metering window 21 is placed adjacent to lens barrel 3 so that light almost equivalent to photographic light transmitted through the photographic lens is incident as measuring light to obtain appropriate exposure in accordance with subject brightness.

This embodiment shows an example of light shield mask 24 forming wide range light shield 26 with a part of a circular arc linked with a chord of the circular arc. However, wide range light shield 26 can be formed into any other shape or even asymmetrical, to be capable of efficiently intercepting outside light. In other words, the wide range light shield should be formed to intercept light over a wider range anywhere susceptible to incidence of more outside light than elsewhere.

As explained above, the camera photometer of the present invention can assure interception of outside light incident in a biased way, due to a light shield mask having an opening behind a photo metering window where subject light is incident, and due to a wide range light shield formed at a part of the light shield mask to intercept light over a wider range than elsewhere and placed to fit apart having a particularly great incidence of light. Therefore, only light beams necessary for photometry can be incident at a maximum, selected from light from the subject.

The edge of the opening of the light shield mask 24 is formed to be continuous between a part along a circular arc and a part along a chord of the circular arc to form a wide range light shield to intercept light over a wider range at a part facing the chord, allowing the shield mask to be worked on, partly keeping the circular arc of the light shield mask having an opening formed to be a circular arc and allowing also the wide range light shield to be formed into a simple shape, thereby facilitating molding of the light shield mask.

The wide range light shield is placed where facing the lens barrel of a photographic lens to intercept reflected light beams and prevent them, at a maximum, from penetrating into a light receptor, even when more light beams are reflected on wider outer surface around the lens barrel when projected more forwardly.

Then, the optical axis of a light receptor, comprising the light receiving element, condenser lens, and photo metering window, is placed to be close to the outer surface of the lens barrel of the photographic lens so that subject light incident to the photographic lens and subject light incident to the light receptor can be more equivalent to each other. The wide range light shield assures interception of light beams reflected on the lens barrel, thereby allowing photo metering data to be obtained in accordance with appropriate exposure required for photographing at an appropriate exposure.

The light shield mask is elastic and applied (i.e., stuck) to the incidence side of the condenser lens to allow the light shield mask to be arranged in a smaller space, without needing a large-sized light receptor, making no obstacle to downsize a camera.

It will become apparent to those skilled in the art that various modifications to the preferred embodiment of the invention as described herein can be made without departing from the spirit or scope of the invention as defined by the appended claims.

What is claimed is:

1. A camera photometer for a camera having a photographic lens with a lens barrel comprises:
    a photo metering window arranged on the front face of the camera to make incidence of subject light;
    a condenser lens to collect the light to make it incident to a light receiving element of the camera to control exposure based on subject brightness information received at the light receiving element; and
    a light shield mask positioned on a side of said condenser lens facing said photo metering window, said light shield mask having an opening behind the photo metering window, said light shield mask is shaped to intercept light over a wide range.

2. A camera photometer for a camera having a photographic lens with a lens barrel comprises:
    a photo metering window arranged on the front face of the camera to make incidence of subject light;
    a condenser lens to collect the light to make it incident to a light receiving element of the camera to control exposure based on subject brightness information received at the light receiving element; and
    a light shield mask having an opening behind the photo metering window, said light shield mask is of a shape to intercept light over a wide range, wherein the light shield mask has an opening with an edge and said opening is formed to be continuous between a part along a circular arc and a part along a chord of the circular arc and a wide range light shield is formed to intercept light over a wider range where facing the chord.

3. A camera photometer as defined in claim 1, wherein said light shield engages said condenser lens.

4. A camera photometer as defined in claim 2, wherein said light shield is arranged to face the lens barrel of a photographic lens.

5. A camera photometer as defined in claim 1, wherein the optical axis of a light receptor comprising the light receiving element, condenser lens, and photo metering window is arranged to be close to the outer surface of the lens barrel of the photographic lens.

6. A camera photometer as defined in claim 2, wherein the optical axis of a light receptor comprising the light receiving element, condenser lens, and photo metering window is arranged to be close to the outer surface of the lens barrel of the photographic lens.

7. A camera photometer as defined in claim 3, wherein the optical axis of a light receptor comprising the light receiving element, condenser lens, and photo metering window is arranged to be close to the outer surface of the lens barrel of the photographic lens.

8. A camera photometer as defined in claim 1, wherein said light shield mask is elastic and is coupled to the incidence side of the condenser lens.

9. A camera photometer as defined in claim 2, wherein said light shield mask is elastic and stuck to the incidence side of the condenser lens.

10. A camera photometer as defined in claim 3, wherein said light shield mask is elastic and is applied to the incidence side of the condenser lens.

11. A camera photometer as defined in claim 4, wherein said light shield mask is elastic and stuck to the incidence side of the condenser lens.

12. A light shield mask for a camera photometer comprising:

a condenser lens to collect the light for a light receiving element; and an elastic light shield mask coupled to said condenser lens on an incident light side of said lens, said mask having an opening with a shape selected to intercept undesired incident light.

13. The light shield mask as defined in claim 12, wherein said mask is adhered to the incident side of said condenser lens.

14. A light shield mask for a camera photometer comprising:

a condenser lens to collect the light for a light receiving element; and an elastic light shield mask adhered to the incident side of said condenser lens, said mask having an opening with a shape selected to intercept undesired incident light, wherein an edge of said opening of said light shield mask is formed to be continuous between a part along a circular arc and a part along a chord of the circular arc and a wide range light shield is formed to intercept light over a wide range where facing the chord.

15. A camera photometer including a photo metering window arranged on the front face of a camera, a condenser lens to collect light to make it incident to a light receiving element, to control exposure based on subject brightness information received at the light receiving element, wherein the improvement comprises:

a light shield mask applied to a side of said condenser lens facing said photo metering window, said light shield mask having an opening formed into a shape to intercept light over a wide range.

16. A camera photometer including a photo metering window arranged on the front face of a camera, a condenser lens to collect light to make it incident to a light receiving element, to control exposure based on subject brightness information received at the light receiving element, wherein the improvement comprises:

a light shield mask applied to said condenser lens, said light shield mask having an opening formed into a shape to intercept light over a wide range, wherein an edge of said opening of said light shield mask is formed to be continuous between a part along a circular arc and a part along a chord of the circular arc and a wide range light shield is formed to intercept light over a wider range where facing the chord.

* * * * *